(No Model.)
E. GALLAHER.
Steam Cooker.
No. 232,701. Patented Sept. 28, 1880.
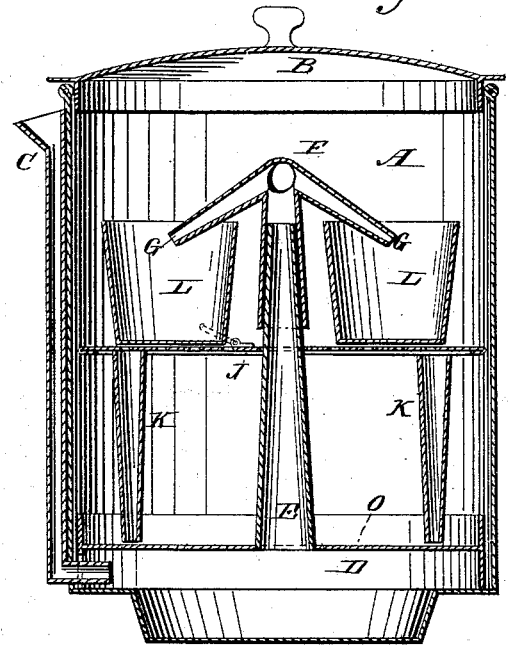
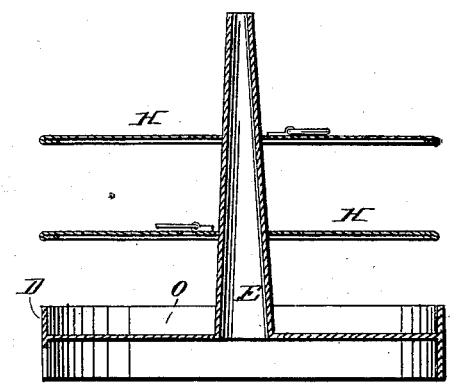
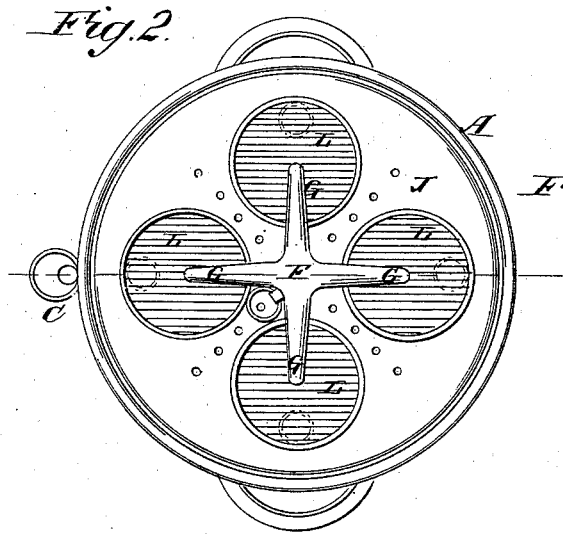
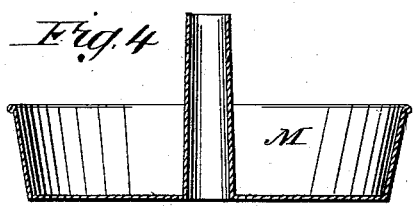
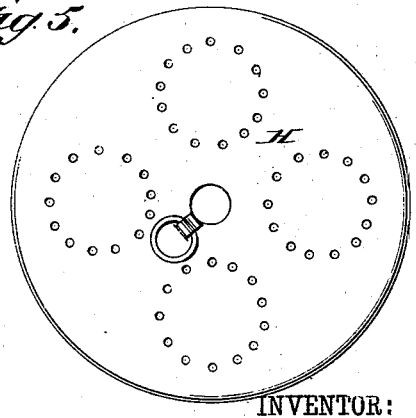
WITNESSES:
Francis McArdle
C. Sedgwick
INVENTOR:
E. Gallaher
BY Munn & Co
ATTORNEYS.

UNITED STATES PATENT OFFICE.

ELIZABETH GALLAHER, OF BRADFORD, PENNSYLVANIA.

STEAM-COOKER.

SPECIFICATION forming part of Letters Patent No. 232,701, dated September 28, 1880.

Application filed May 31, 1880. (No model.)

*To all whom it may concern:*

Be it known that I, ELIZABETH GALLAHER, of Bradford, McKean county, Pennsylvania, have invented a new and Improved Steam-Cooker, of which the following is a specification.

The object of my invention is to provide a new and improved steam-cooker which is simple in construction, and in which any kind of food can be cooked thoroughly and rapidly.

The invention will first be described in connection with the drawings, and then pointed out in the claim.

In the accompanying drawings, Figure 1 is a cross-sectional elevation of my improved steam-cooker. Fig. 2 is a plan view of the same, the lid being removed. Fig. 3 is a cross-sectional elevation of the bottom disk, with the central steam-tube carrying the perforated supporting-disks. Fig. 4 is a cross-sectional elevation of a circular baking-pan to be used in my improved steam-cooker, and Fig. 5 is a plan view of the perforated supporting-disks carried by the central steam-tube.

Similar letters of reference indicate corresponding parts.

A cylindrical vessel, A, is provided with a lid, B, and a tube, C, which extends to the bottom, so that the vessel can be conveniently filled with water. A disk, O, is provided with an annular flange, D, resting on the bottom of the vessel A, and with a central steam-tube, E, extending almost to the top of the vessel. A detachable head or top piece, F, is mounted on the top of the tube E, and is provided with a series of smaller tubes, G G, which are inclined downward, and deliver the steam rising in the tube E upon the articles to be cooked, which are placed upon perforated supporting-disks H, carried by the tube E, or upon a perforated disk, J, provided with four legs, K.

The food may be placed in cups or cases L, resting upon the disks, or may be placed in the circular pan M.

The within-described steam-cooker is used as follows: The top F of the tube E is first removed, and then one or more disks, H, are placed upon the tube E, or the disk J, with the legs or supports K, is placed upon the same, and the articles to be cooked or the cans L containing them are placed upon these disks in such a manner that the steam issuing from the ends of the tubes G is delivered into or upon the cans or cups L. If soft bread or biscuit are to be baked, the dough is placed in the circular pan M, the pan is placed upon the tube E, and the top F is then placed upon the tube. If it is desired to prevent water or grease from dripping from above, the cans or cups L must be placed in the circular pan M.

In canning goods, the bottles or cans to receive them are placed upon the disk J, provided with four legs, so that the said cans are directly below the ends of the tubes G.

The steam-cooker may be used in various other ways, and always cooks very rapidly and thoroughly.

Having thus described my invention, I claim as new and desire to secure by Letters Patent—

The vessel A, having lid B, water-tube C, flanged disk D, with central tube, E, the head F, with downwardly-inclined tubes G, and the perforated disk J, with legs K, as shown and described.

ELIZABETH GALLAHER.

Witnesses:
G. H. BELL,
HEPBURN McCLURE.